United States Patent
Fernandez et al.

(10) Patent No.: US 7,242,579 B2
(45) Date of Patent: Jul. 10, 2007

(54) SYSTEM AND METHOD FOR PROVIDING COOLING IN A THREE-DIMENSIONAL INFRASTRUCTURE FOR MASSIVELY SCALABLE COMPUTERS

(75) Inventors: Kenneth Richard Fernandez, Morgan Hill, CA (US); Claudio Matthias Fleiner, San Jose, CA (US); Robert Barton Garner, San Jose, CA (US); Harald Huels, Bodenheim (DE); Manfred Ries, Mainz (DE); Winfried Wolfgang Wilcke, Los Altos Hills, CA (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 10/754,971

(22) Filed: Jan. 9, 2004

(65) Prior Publication Data

US 2005/0152114 A1    Jul. 14, 2005

(51) Int. Cl.
 G06F 1/20     (2006.01)
 H05K 7/20     (2006.01)
(52) U.S. Cl. ............... 361/687; 333/24 C; 340/539.26; 29/854

(58) Field of Classification Search ................ 333/246, 333/260, 24 C; 257/E23.01, E25.03; 29/729.1, 29/854; 361/679–687, 724–727; 340/539.26
See application file for complete search history.

(56) References Cited

U.S. PATENT DOCUMENTS 6,137,675 A * 10/2000 Perkins ........................ 361/679
7,005,982 B1 * 2/2006 Frank ..................... 340/539.26
7,038,553 B2 * 5/2006 Garner et al. ............. 333/24 C
7,173,820 B2 * 2/2007 Fink et al. ................... 361/687

* cited by examiner

Primary Examiner—Hung Van Duong
(74) Attorney, Agent, or Firm—Mark C. McCabe

(57) ABSTRACT

A three-dimensional computer infrastructure cooling system is provided. The three-dimensional computer infrastructure cooling system includes at least one compute, storage, or communications brick. In addition, the three-dimensional computer infrastructure cooling system includes at least one coldrail to facilitate the removal of heat from the at least one compute, storage, or communications brick. Also, the three-dimensional computer infrastructure includes a brick-internal carrier within the at least one compute, storage, communications brick, wherein the brick-internal carrier is attached to the at least one coldrail. Moreover, the three-dimensional computer infrastructure includes a power dissipating electronic element within the at-least-one compute, storage, or communications brick, wherein the power dissipating element is attached to the brick-internal carrier.

13 Claims, 7 Drawing Sheets

SYSTEM AND METHOD FOR PROVIDING COOLING IN A THREE-DIMENSIONAL INFRASTRUCTURE FOR MASSIVELY SCALABLE COMPUTERS

FIELD OF THE INVENTION

The present invention relates to computer cooling systems and, more specifically, to a system and method for providing the removal of heat from a scalable computer, made of compute, storage, or communication subsystems ("bricks") arranged in a three-dimensional pile.

BACKGROUND OF THE INVENTION

For certain important problems in science and engineering-such as solving a wide class of computational fluid dynamics, multi-particle, or life-sciences problems—there is an unlimited demand for computing performance. This need can only be fulfilled by massively parallel computers with many thousands of processors,. providing a performance measured in PetaFLOPS ($10^{15}$ FLoating-Point Operations per Second) and beyond. At the same time, the demand for storage has grown as fast as that for computation. Large commercial datacenters in 2003 require on the average of one Petabyte ($10^{15}$ bytes) of on-line, disk-based storage, and certain geospatial and security government applications will require tens to hundreds of petabytes within a few years. Large, massively parallel clustered computers also require Terabit/sec network bandwidth and switches. The future will see data-intensive enterprise applications which combine simultaneous demands for extreme compute power, storage, and communications.

The design of individual compute, storage, and communication subsystems is a well-practiced art, as are the programming techniques for parallelizing large classes of scientific/engineering, and commercial problems. Physical packaging, power dissipation, adequate inter-subsystem communication, and the ability to deal with failures have become the tough problems as the individual subsystems get smaller, more numerous, and more powerful.

Packaging for supercomputers is a long-recognized problem. Seymour Cray cited "the thickness of the wiring mat and getting rid of the heat" as the key problems in supercomputer design.

SUMMARY OF THE INVENTION

According to the present invention, there is provided a three-dimensional computer infrastructure cooling system comprising at least one compute, storage, or communication system ("brick"). In addition, the three-dimensional computer infrastructure cooling system includes at least one coldrail to facilitate the removal of heat from at least one brick. Also, the three-dimensional computer infrastructure includes a brick-internal carrier within the at least one compute, storage, or communications brick, wherein the brick-internal carrier is attached to the at least one coldrail. Moreover, the three-dimensional computer infrastructure includes at least one power dissipating electronic element within the at least one compute, storage, or communications brick, wherein the power dissipating element(s) is attached to the brick-internal carrier.

CROSS-REFERENCE TO RELATED APPLICATIONS

This application is related to the following co-pending and commonly assigned patent application, which application is incorporated by reference herein:

U.S. patent application Ser. No. 10/264,893, entitled "A Scalable Computer System Having Surface-Mounted Capacitive Couplers for Intercommunication", by Robert B Garner, et. al., filed on Oct. 3, 2002.

DETAILED DESCRIPTION OF THE INVENTION

The invention describes a cooling system for a 3-dimensional packaging scheme for massively scalable computer, storage, and communication systems. Processing, storage, and communication subsystems are packaged into standardized "bricks", which densely fill space. Bricks communicate with their immediate neighbors via connecting elements ('couplers') mounted on all their faces, forming a 3-dimensional mesh interconnect. The bricks are mounted within a two-dimensional array of cold-rails, which remove the heat created by the electronics within the bricks. Thermal and interconnect analysis is provided to show the feasibility of the concept.

System Structure

Figure 1:
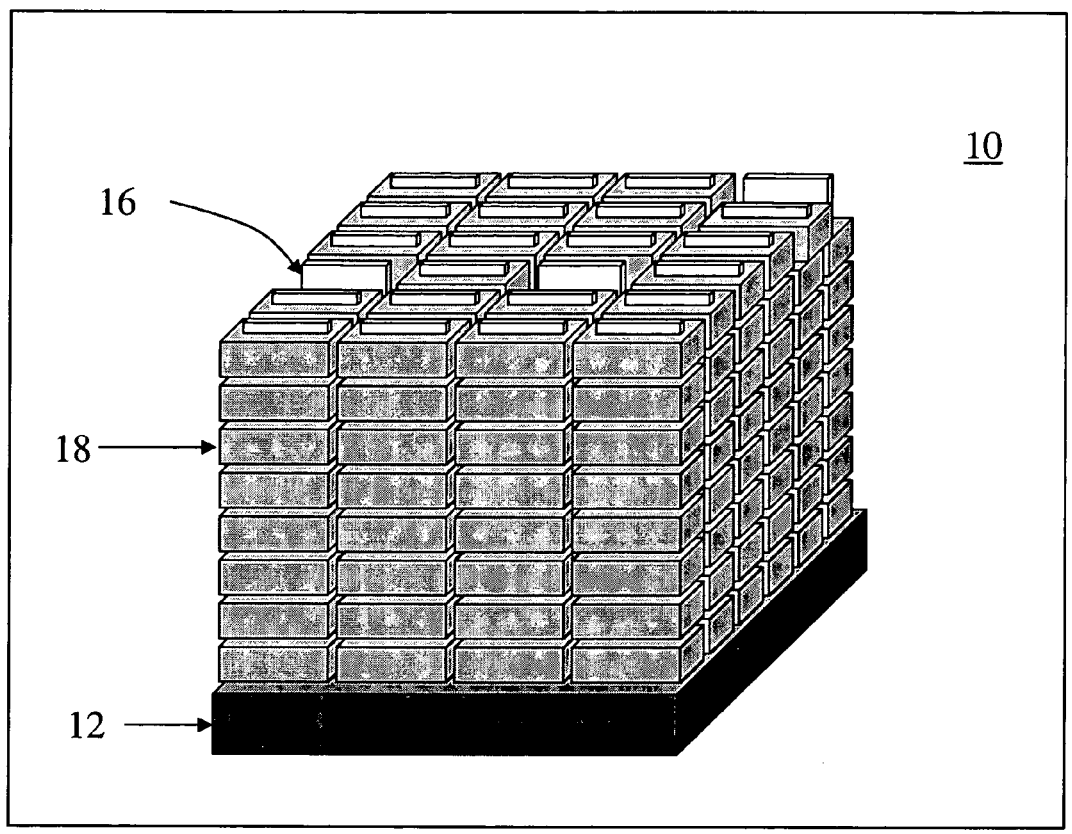
FIG. 1 shows an example of a three-dimensional brick-based computer.

FIG. 1 shows an exemplary brick-based computer system 10 in which the invention will be utilized. Brick-based system 10 includes several vertical columns of bricks 12.

Figure 2:
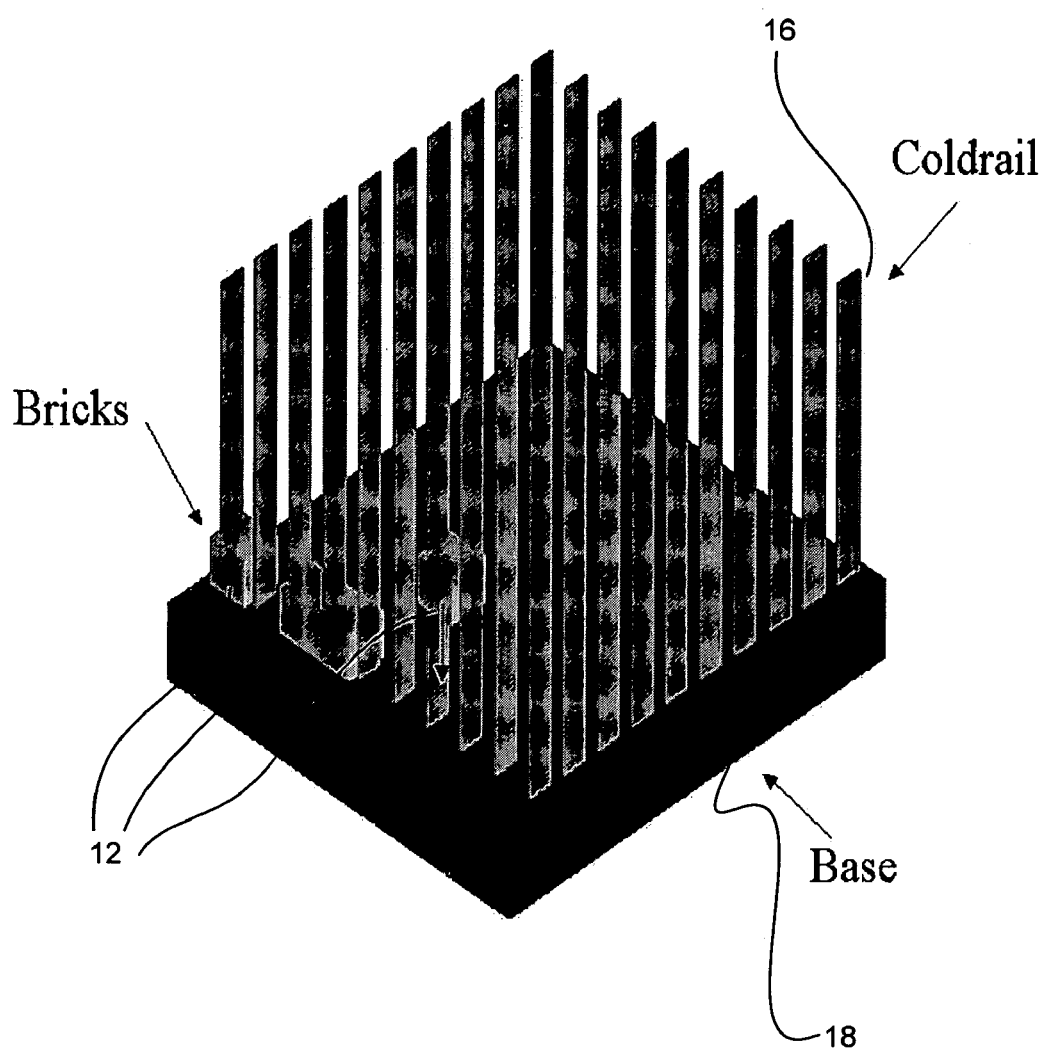
FIG. 2 shows a three-dimensional brick-based computer internal structure.

FIG. 2 shows the internal structure 14 of an exemplary brick-based computer system 10 in which the invention will be utilized. An array of coldrails 16 is mounted on a base plate 18 and the individual bricks 12 slide down the coldrails 16 into resting position during assembly or, during operation. The bricks 12 include internal heat dissipating elements (not shown). The bricks 12 internal heat dissipating elements are in thermal contact with the coldrails 16.

The shape of the brick-based computer system 10 is not limited to the approximately symmetrical cube shown in FIG. 1. Towers, 2-dimensional walls, rectangular hollow or L-shaped piles of bricks are all feasible. Shapes with a high surface-to-volume ratio allow easier access to bricks 12 where necessary. Brick-based computer system 10 can be scaled in the horizontal directions to very large sizes, whereas scaling in the vertical direction may be limited by floor loading considerations.

Coldrails

Figure 3:
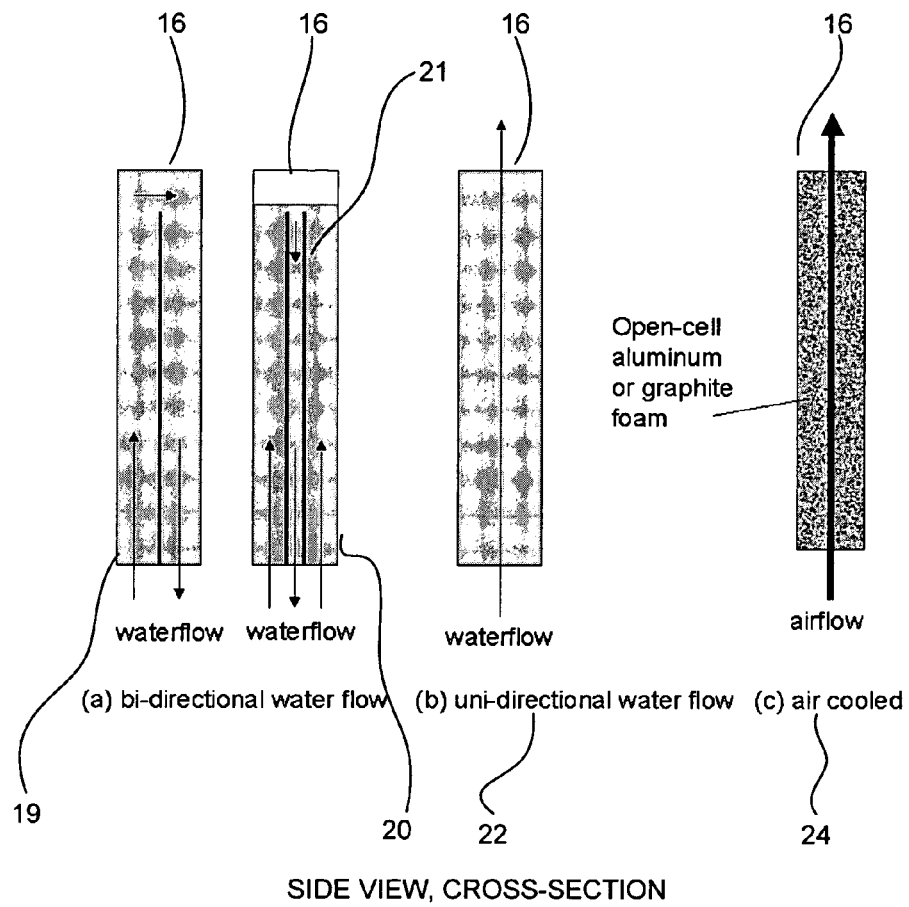
FIG. 3 shows four separate implementations of vertical coldrails in cross-section.

FIG. 3 shows a coldrail 16 utilizing water in which the water flow is bi-directional 19 and 20, a coldrail 16 utilizing water in which the water flow is uni-directional 22 and a coldrail 16 which is air-cooled 24.

Liquid-cooled coldrails 16 may either have a unidirectional or a bi-directional flow of the cooling liquid. The bi-directional liquid flow is preferred if easy access to one face of the brick-based computer system 10 is required, such as for brick-based systems 10 which need to be upgraded with additional bricks 12 while in operation. The uni-directional flow of water is best suited for a very large brick-based system 10 containing a fixed number of bricks 12 per coldrail 16 that do not require upgrading during operation. The air-cooled coldrail is suitable for a small brick-based system 10. The heat transfer within an air-cooled coldrail 16 can be greatly enhanced by filling the coldrail 16 with open-cell metal foam or graphite foam. The heat transfer within a liquid-cooled cold rail can be greatly enhanced by increasing its surface area via small channels or grooves in the inside surfaces. Note that the coldrails can be manufactured inexpensively via an extrusion process.

In an exemplary embodiment, bi-directional flow 20 is used. Bi-directional flow 20 includes overflow tube 21. Overflow tube 21 is a hollow tube including an opening in its top portion (e.g., 1 cm diameter opening) which facilitates the downward flow of liquid-coolant in bi-directional flow 20. Referring to bi-directional flow 20, liquid-coolant enters coldrail 16 through bottom and rises in an upward flow. As more liquid-coolant is pumped into coldrail 16, the liquid-coolant continues to flow upward until it reaches the top of overflow tube 21. Upon reaching the top of overflow tube 21, the liquid-coolant flows over the edge of the top portion of overflow tube 21 and enters a downward flow through overflow tube 21, completing bi-directional flow 20.

Brick Externals

Figure 4:
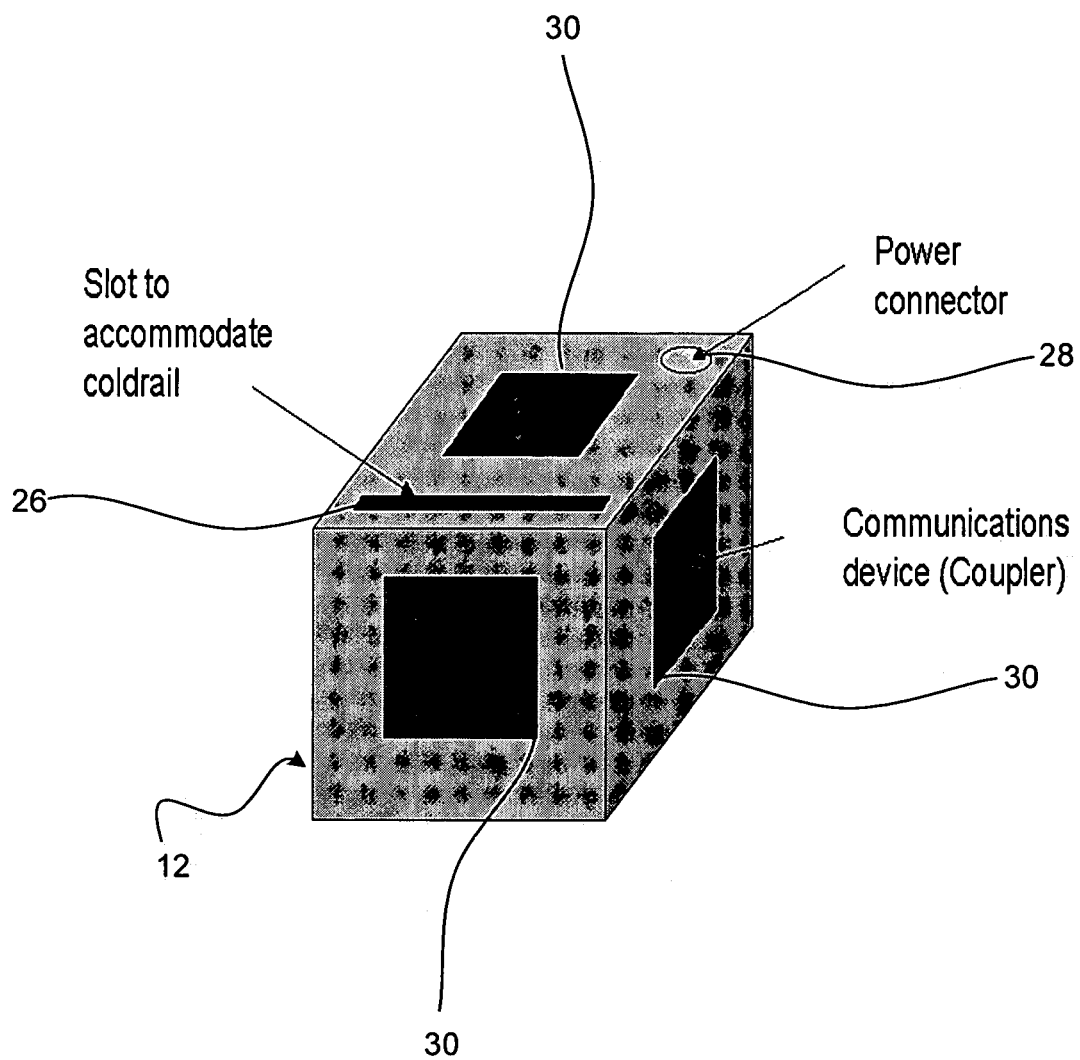
FIG. 4 shows an external view of a brick.

FIG. 4 shows a generic external structure of a brick 12. The external structure shows a coldrail slot 26 to accommodate coldrail 16. Also, the external structure shows a power connector 28 to provide a means for delivering power to brick 12.

All bricks 12 have an internal means of forming tight thermal contact with a coldrail 16 and a way to communicate bi-directionally with each of their six immediate neighbors using a communications device mounted on each face of each brick. The term 'coupler' or 'capacitive coupler' 30 is used for face-mounted communication devices. The coupler bi-directionally conveys electrical signals form one brick to another, either via direct metallic contacts, or via capacitive coupling (as described in U.S. patent application Ser. No. 10/264,893).

Figure 5:
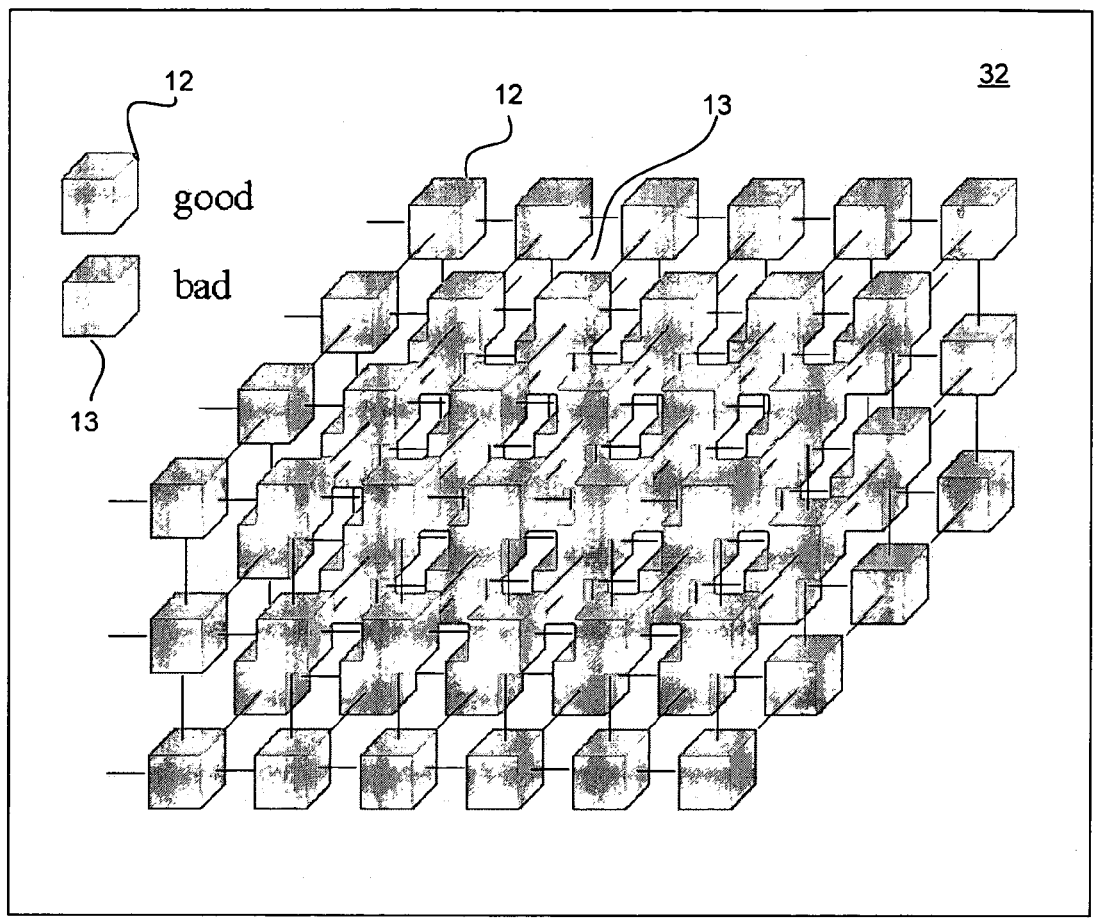
FIG. 5 shows a network fabric associated with a three-dimensional brick-based computer.

FIG. 5 shows multiple bricks in a brick-based system 10, where the bricks 12 form a 3-dimensional network fabric 32.

In the case of a brick 'wall', which is only one brick deep, the 3-dimensional network fabric 32 will degenerate into a 2-dimensional mesh. The 3-dimensional network fabric 32 can have irregular surfaces and holes, as bricks 12 may have failed (e.g., failed brick 13).

While bricks 12 have been described as rectangular-shaped bricks 12, the invention is not so limited. In alternate embodiments, similar brick-based systems 10 could be assembled with other brick shapes which fill space densely.

Brick Internals

Figure 6:
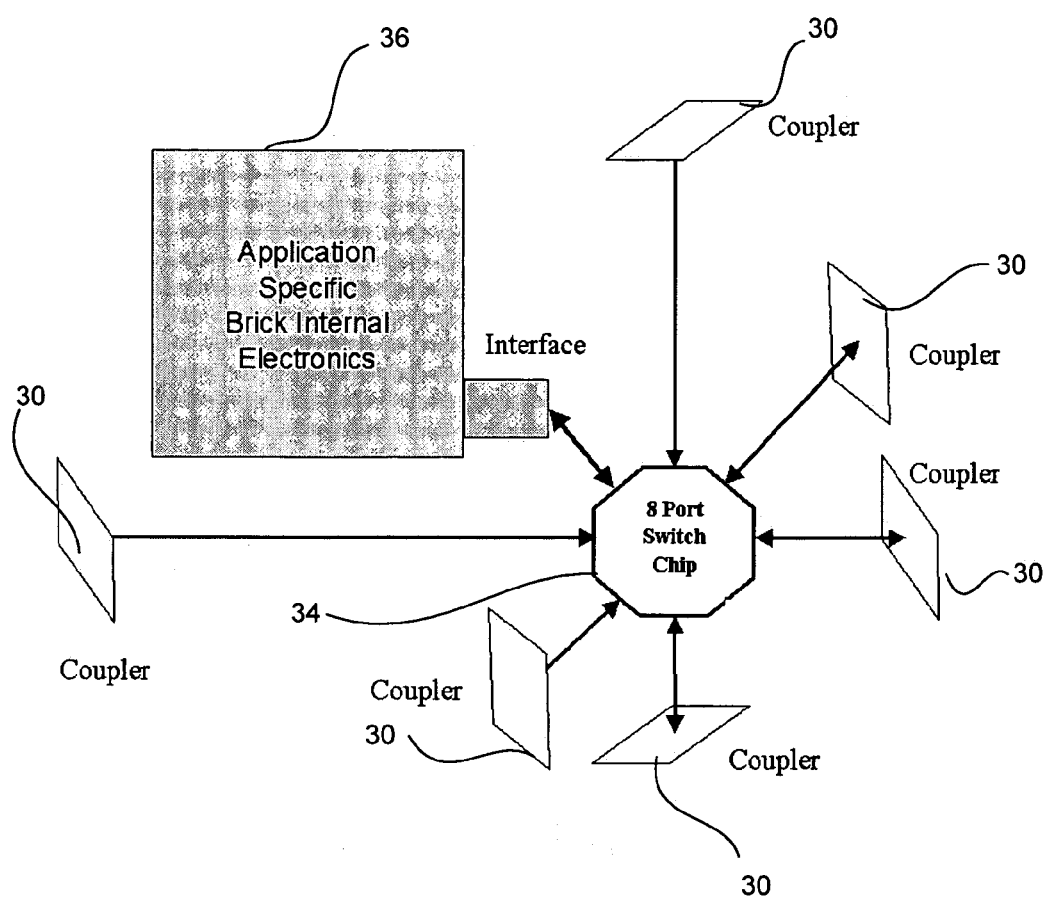
FIG. 6 shows the internal electronics block diagram of a subsystem brick.

FIG. 6 shows the internal electronics block diagram of a brick 12, according to an exemplary embodiment of the Invention. All bricks 12 contain a switching element 34 with six ports for brick-to-brick couplers, connected to the six couplers 30 on the faces of the brick 12, and an additional ports 15 used to link the internal electronics 36 of a brick 12 into the 3-dimensional network fabric 32.

The internal electronics of a brick 12 are determined by the specific application of the brick-based system 10. Examples include, but are not limited to, bricks 12 containing one or more microprocessors with associated support electronics, one or more disks or other storage devices such as large arrays of random-access memories, and pure communication switching bricks.

All bricks 12 are either of the same size or have dimensions which are integer multiples of the smallest brick 12 of a brick-based system 10 in one, two, or three dimensions.

There are multiple ways by which heat can be transferred from the brick-internal electronics board to the coldrails 16. These include but are not restricted to:

- solid metallic conductors
- heat pipes
- spring loaded metal pistons as used in IBM Thermal Conduction Modules
- carbon-based, thermally-conductive materials
- freestanding or imbedded carbon nanotubes material
- lightly crushed copper wool between the PC-board elements and the cooling elements
- filling the inside of the brick with electrically isolating, but thermally well conducting fluids.
- filling the inside with thermally-conductive polymer or plastic Mechanical Alignment The various coupler schemes require, to a varying degree, alignment between a coupler on one brick and the corresponding coupler on another brick. Alignment may be achieved in several ways, which may be combined. These include:

Direct stacking of dimensionally accurate bricks:

There are several methods for making dimensionally accurate bricks at low cost, including:

a) Stressed-skin, monocoque-type construction, where all four vertical walls of a brick are formed by one extrusion nozzle, cut to a precise length; and b) Frame-type construction with non-load-bearing skins. In this implementation, dimensional accuracy is achieved by having four vertical rails of precise length form the vertical corners of a brick. Mounting holes in the system base plate, drilled at precise x,y coordinates, insure the horizontal accuray and the precise length of the frame rails insures the vertical accuracy. The surface skins are mounted to the frames and their function is to resist sideways shearing forces, provide a surface to mount coupler and shield the electronics inside a brick, but not to carry any significant load or provide dimensional accuracy.

Stacking within a framework of dimensionally accurate guide rails

Mounting couplers in alignment frames. Such frames can move with respect to the bricks they are part of and are designed in such a way that two adjacent frames will mutually align themselves with each other into a well-defined position. This can be achieved with a series of bumps, holes or grooves which are part of the alignment frames.

Power

Electrical power may either be transmitted from brick to brick with a series of power connectors 28 at opposing sides of a brick 12, in a direction parallel to the coldrails 16, or through an array of conducting rails, similar but separate from the coldrails 16. Coldrails 16 may act as the common ground in the brick-based system 10. AC power transmission from brick 12 to brick 12 can also be achieved by close inductive coupling.

Consideration may be given to transmitting voltages conforming to safety regulations for exposed voltages and utilizing transformers or DC-DC converters within each brick 12 to create the locally required voltages. In addition, the electronics within each brick 12 should be able to locally detect over-current/over-voltage conditions and shut down a brick 12 if necessary.

Brick-based system 10 could include gaseous fire-extinguishing agents such as Halon.

A secondary, out-of-band, low-bandwidth network may be implemented between bricks 12 by a multitude of possible signaling methods. It may be used for basic brick management (e.g., power, operational, etc.), and may utilize any of the coupler schemes, or use the power distribution grid for information transmission.

The entire brick-based system 10 can be enclosed in an electromagnetic shield to reduce or prevent electromagnetic interference (EMI). This is facilitated by the cooling method, as there may be no air-flow cooling required by the bricks.

Cooling

Figure 7:
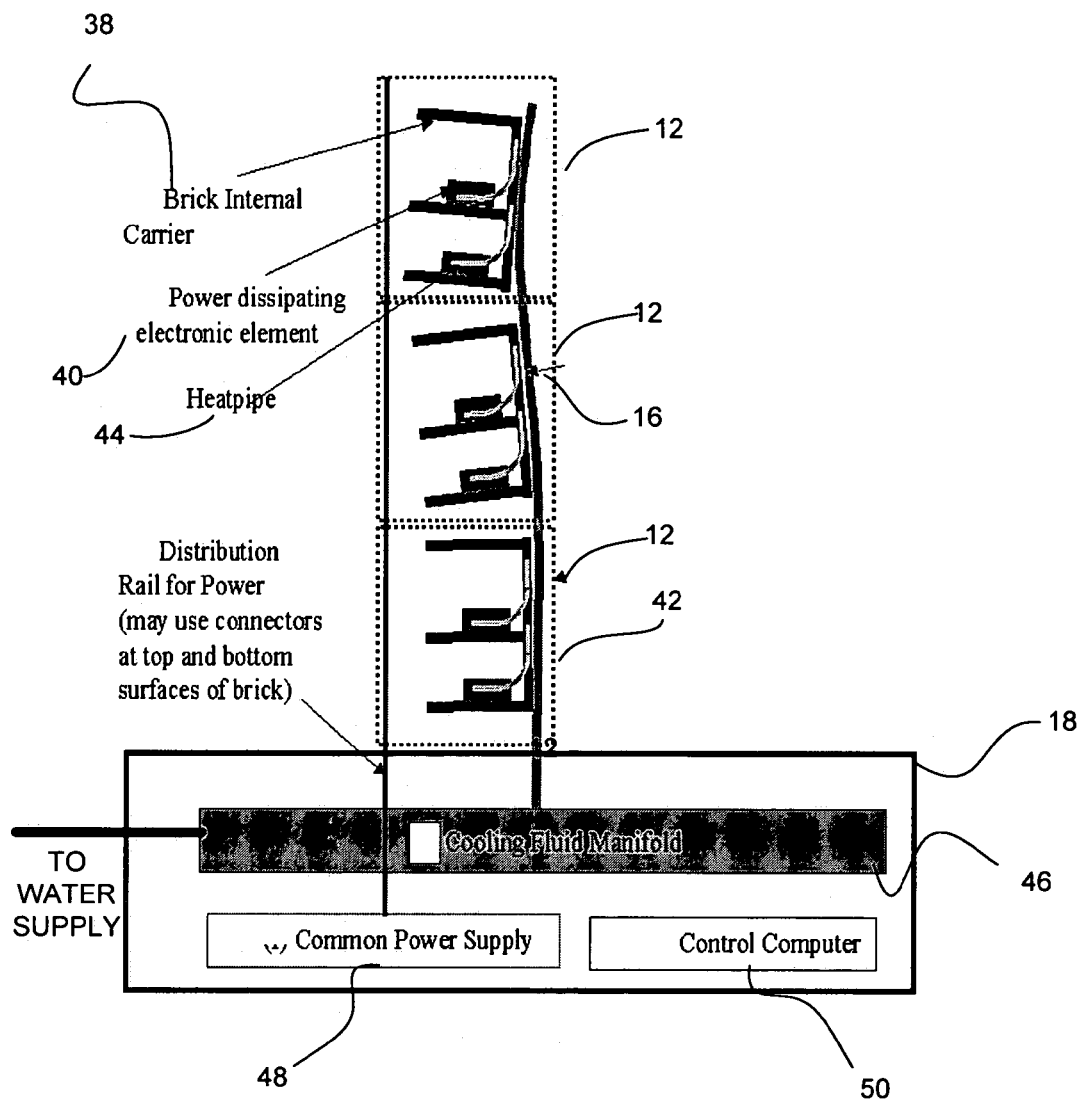
FIG. 7 shows an three-dimensional brick-based computer cooling system, along one coldrail, in cross-section according to an exemplary embodiment of the invention.

FIG. 7 shows a coldrail 16 in contact with bricks 12 in a brick-based system 10, according to an exemplary embodiment of the invention. Coldrail 16 is mounted vertically on a Base 18. Only one instance of a coldrail 16 with a column of three bricks is shown. Each brick 12 consists of an internal carrier 38, power-dissipating electronic elements 40 mounted on the carrier 38 and the external brick surfaces (or skins) 42. Heatpipes 44 or the internal conductivity of the carrier 38 is used to carry heat from the electronic elements 40 to the back of the internal carrier 38, which is in good thermal contact with the coldrail 16. The surfaces 42 of the bricks 12 need to be well aligned. The exact requirements for the alignment precision depend on the type of coupler 30 utilized.

The coldrail 16 may be possibly warped, shown greatly exaggerated in FIG. 7. To avoid the affects of this warping on the alignment of the brick surfaces 42, the internal carrier 38 is configured within brick 12 so that it can move with respect to the brick surfaces 42. A clamping mechanism (not shown) firmly presses the internal carrier 38 against the coldrail 16. Since the carrier 38 may move with respect to the brick surfaces 42, its thermal contact area to the coldrail 16 is optimized. A thin thermal interface material (not shown) is applied between the coldrail 16 and the internal carrier 38 surface.

In an exemplary embodiment, the bricks 12 are stacked on top of each other, using alignment pins at their top and bottom surface corners to hold them into position.

In an exemplary embodiment, the base 18 contains a manifold 46 for distributing the coolant fluid, a common power supply 48 and a control computer 50. Power is distributed vertically through a brick column. Connectors on the top and bottom of each brick 12 and a power rail within each brick 12 can be used in lieu of a common power rail for the entire column. In an alternative embodiment, manifold 46, common power supply 48 and/or control computer 50 are external to base 18.

Thermal Considerations

By way of an example, we will discuss the temperature differential $\Delta T$ between the temperature of the cooling water at the intake and the case temperature of highly dissipative integrated circuit chip on a printed-circuit board in the brick electronics 36. $\Delta T = \Sigma T_i$ is the sum of the individual temperature differentials along the path of the heat. In the way of an example, consider using heat pipes to carry heat from the processor to the water in a coldrail 16. Significant contributions to the total $\Delta T$ include the transfer from the integrated circuit substrate to the chip package, thermal coupling to the heat pipe 44, conduction along the heat pipe 44, thermal coupling to the coldrail 16 surface and thermal transfer into the flowing water within the coldrail 16. Analysis shows that the most important temperature differentials occur in the integrated circuit packaging itself and in metal-to-metal interfaces. The latter typically requires some thermal interface materials between the metal surfaces to achieve sufficiently small temperature differentials.

The temperature gradient along the heat pipe 44 is very small. The temperature differentials at the condenser end of the heat pipe 44 and the transfer into the flowing water are small, too, as the surfaces involved are much larger than those of the integrated circuit itself, and the heat flux ($W/cm^2$) is correspondingly smaller. It appears feasible to extract several hundred kW per cubic meter with this scheme. Note that in any modern electronic system the sources of intense heat are concentrated in a small number of chips. This makes it feasible to apply high-performance cooling mechanisms, such as heat pipes 44, to these sources and rely on convective cooling within the brick for the remaining heat dissipating elements 40.

Thus, a system, method and service to provide a cooling system for a 3-dimensional packaging scheme for massively scalable computer, storage, and communication systems have been described. Although the present invention has been described with reference to specific embodiments, it will be evident that various modifications and changes may be made to these embodiments without departing from the broader spirit and scope of the invention. Accordingly, the specification and drawings are to be regarded in an illustrative rather than a restrictive sense.

The invention claimed is :

1. A three-dimensional computer infrastructure cooling system, comprising:
   at least one brick;
   at least one coldrail to facilitate the removal of heat from the at least one brick;
   a brick-internal carrier within the at least one brick, wherein the brick-internal carrier is attached to the at least one coldrail; and
   a power dissipating electronic element within the at least one brick, wherein the power dissipating element is attached to the brick-internal carrier,
   whereby the brick-internal carrier facilitates delivery of heat from the heat dissipating element to the at least one coldrail.

2. The computer infrastructure cooling system of claim 1 wherein the brick is a compute, storage or communications brick.

3. The computer infrastructure cooling system of claim 1 further comprises a heat conducting element within the brick wherein the heat conducting element is attached at a first end to the power dissipating electronic element and at a second end to the brick-internal carrier.

4. The computer infrastructure cooling system of claim 1 further comprises a base to which the coldrail is mounted.

5. The computer infrastructure cooling system of claim 1 wherein the brick includes an opening at two ends which allow the brick to be slid down the coldrail into a resting position towards the base.

6. The computer infrastructure cooling system of claim 1 wherein the coldrail is attached via a clamp to the brick-internal carrier.

7. The computer infrastructure cooling system of claim 3 wherein the heat conducting element is a heat pipe.

8. The computer infrastructure cooling system of claim 4 wherein the base includes a cooling manifold to deliver a coolant through the coldrail, wherein the coolant removes heat from the brick via the coldrail's attachment to the brick-internal carrier.

9. The computer infrastructure cooling system of claim 4 wherein the base includes a control computer to monitor the cooling system.

10. The computer infrastructure cooling system of claim 6 wherein the brick-internal carrier can move with respect to the external surface of the brick,
    whereby the brick-internal carrier's ability to move with respect to the brick external surface provides for optimization of the brick-internal carrier's contact area to the coldrail and allows for warping of the coldrail.

11. The computer infrastructure cooling system of claim 6 wherein a thermal interface material is applied between the coldrail and the brick-internal carrier surface in order to achieve optimal temperature differentials.

12. The computer infrastructure cooling system of claim 8 wherein the coolant is an air coolant or a liquid coolant.

13. The computer infrastructure cooling system of claim 8 wherein the coolant can have either a uni-directional or a bi-directional flow through the coldrail.

\* \* \* \* \*